United States Patent [19]
Fowler

[11] 3,746,842
[45] July 17, 1973

[54] DIGITAL MAGNETIC COMPASS
[75] Inventor: John T. Fowler, Winthrop, Mass.
[73] Assignee: The Laitram Corporation, New Orleans, La.
[22] Filed: Sept. 27, 1971
[21] Appl. No.: 184,003

[52] U.S. Cl. ...... 235/92 CV, 235/92 R, 235/92 CA, 235/92 CC, 235/92 EC, 340/347 P, 235/150.25
[51] Int. Cl. .......................................... G06m 1/272
[58] Field of Search ................... 235/92 CA, 92 CC, 235/92 EC, 92 FQ

[56] References Cited
UNITED STATES PATENTS
3,637,997  1/1972  Petersen .................... 235/92 CA Primary Examiner—Maynard R. Wilbur
Assistant Examiner—Robert F. Gnuse
Attorney—Robert J. Schiller et al.

[57] ABSTRACT

A magnetic compass in which the compass card and gimbal mounting are all located inside a sealed enclosure filled with damping fluid. The compass card is digitally coded and photoelectric means are provided for reading the card and generating a digital number corresponding to the rotational position of the card relative to the enclosure, corrected for local magnetic variation. Means are provided for comparing the compass reading with the corrected course reading to provide an error signal or an off-course alarm if desired.

10 Claims, 5 Drawing Figures

Patented July 17, 1973  3,746,842

INVENTOR.
JOHN T. FOWLER
BY
*Schiller & Pandiscio*
ATTORNEYS

Patented July 17, 1973

INVENTOR.
JOHN T. FOWLER
BY
Schiller & Pandiscio
ATTORNEYS

DIGITAL MAGNETIC COMPASS

This invention relates to magnetic compasses and more particularly to a magnetic compass providing direct digital indications of direction.

The ordinary magnetic compass usually comprises one or more bar magnets suspended in a damping medium to respond primarily to the horizontal component of the earth's magnetic field. Associated with the magnets is a rotor element such as a compass rose or the like, having graphic indicia thereon. In top-viewing compasses, the element is usually a substantially flat card, while in front-viewing compasses the element is usually a drum. The rotor, magnets and medium are enclosed in a bowl having a window through which the graphic indicia can be viewed and correlated with a fiducial mark. Gimbal arrangements to keep the magnets horizontal are usually independent of the compass rotor.

In order to ascertain the compass heading as shown by the relationship between the indicia on the rotor and the fiducial mark, the user generally must be close to the compass. Hence, the standard type of compass is not suitable for remote reading. Additionally, correlation between the indicia and fiducial mark is often inexact due to parallax problems, and the close spacing of the degree indications, particularly in compasses having a small diameter (e.g., 4 inches) rotor, often contribute to inaccuracy in reading the devce.

A principal object of the present invention is to provide a magnetic compass capable of providing an output in the form of A group of digital signals which can be displayed and read at remote points or otherwise processed for display and/or control. Other objects of the present invention are to provide such a compass in which the directional relation between the compass mounting and the rotor is determined photoelectrically; to provide such a compass in which the directional relation is directly derived as a digital, as distinguished from analog, value; to provide such a compass which is adjusted for local magnetic variation and to provide such a compass including means for comparing the compass heading with a desired course so as to provide an off-course indication.

To achieve the foregoing and other objects, the invention generally comprises a rotor fixed to and rotatable with a magnetic body, a frame supporting the rotor for rotation of the latter, and an enclosure or bowl surrounding the frame and rotor. The frame is supported for movement within the bowl through two degrees of freedom by gimbal means, and the bowl is preferably filled with a fluid medium for damping motion of both the rotor and frame. The rotor bears thereon a coded mask and the frame supports a light source disposed to one side of the mask and photoelectric means disposed to the other side of the mask, all arranged so that the position of the rotor with respect to the frame is uniquely identified by the nature of the light signals detected by the photoelectric means. The light signals are employed to generate a digitally coded signal corresponding to the position of the rotor with respect to the frame. Means are provided for converting the coded signal to a decimal course display, by comparing the coded signal with the count in a clocked counter means and displaying the count in the counter means reached when the comparison results in stopping the clock. In a preferred embodiment, the compass output is compared in a first comparator to the state of a first counter and a selected desired course is compared in a second comparator to the state of a second counter, both counters counting the same clock. Following comparison, the difference between the two counter states is indicative of the extent to which the compass and desired course differ. Digital logic is provided for adjusting the operation of the counters and clock to accomodate for the counting problems arising out of the transition between zero and 360°.

Other objects of the invention will in part be obvious and will in part appear hereinafter.

The invention accordingly comprises the method and apparatus involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
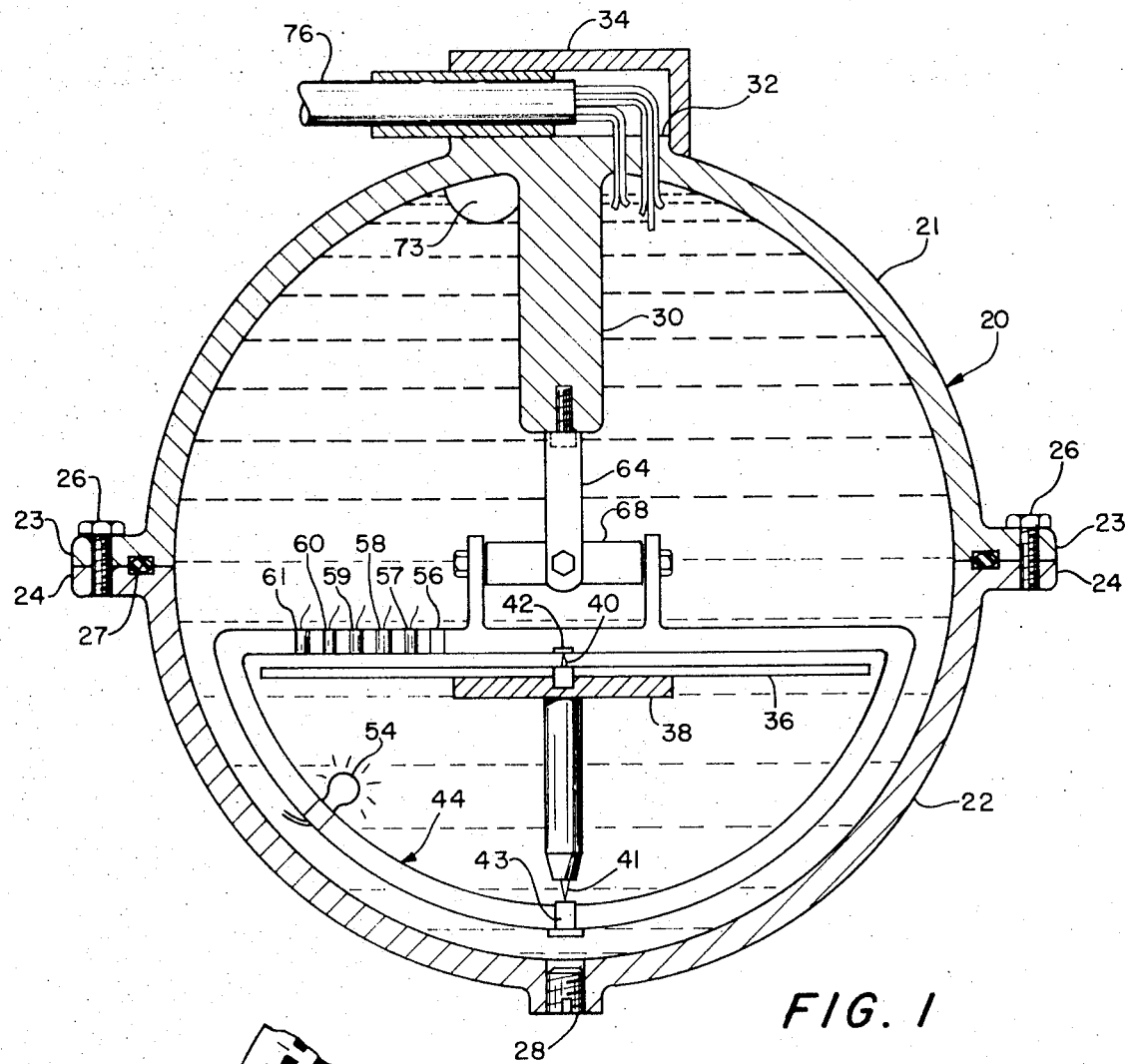
FIG. 1 is an elevational view partly in section of a compass embodying the invention, the section being taken through the axis of rotation of the compass rotor.

Referring now to the drawings there is shown in FIG. 1 one embodiment of the present invention including enclosure 20. The latter is formed of a non-magnetic (i.e., diamagnetic or paramagnetic) material preferably a rigid organic polymer such as polyvinylchloride or the like. Enclosure 20 is shaped in a hollow, substantially spherical form made for convenience, out of two hemispheres 21 and 22 with mating peripheral flanges 23 and 24 which can be locked together by bolts 26 to form the desired spherical shape. In order to insure against fluid leakage between flanges 23 and 24, the latter are grooved to form, when locked together, a channel in which a sealing element such as O-ring 27 can be disposed. Positioned substantially centrally in and extending through the wall of lower hemisphere 22 is an aperture normally closed by threaded plug 28. Positioned substantially centrally on the interior wall of upper hemisphere 21 and extending radially inwardly is a support or post 30 having a length somewhat shorter than a full radius. Adjacent the base of post 30 is at least one opening 32 through the wall of hemisphere 21, theouter periphery of opening 32 being enclosed within sealing means such as stuffing box 34.

The compass of FIG. 1 also includes a rotor shown in the form of circular card 36 having attached thereto one or more bodies, such as bar magnet 38, which have associated therewith a magnetic dipole field of sufficient strength to interact the earth's magnetic field (when non-aligned therewith) and generate a torque tending to turn the card and magnet into alignment with at least the horizontal component of the earth's magnetic field.

Figure 2:
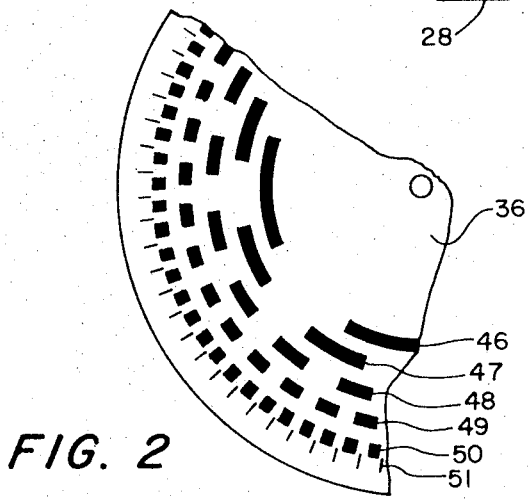
FIG. 2 is a fragment showing, in plan the rotor of the embodiment of FIG. 1.

Card 36 is mounted for free rotation about a pair of central colinear pivots pins 40 and 41 extending perpendicularly to the plane of card 36 in opposite direction to one another. Pivot pins 40 and 41 are engaged within corresponding pivot bearings 42 and 43 which in turn are fixed to frame 44. Card 36, shown in fragment in FIG. 2, is provided with a plurality of annular, concentric information channels or tracks of different radii such as tracks 46, 47, 48, 49, 50 and 51, it being understood that the number of tracks shown is merely exemplary and not limiting. The tracks are coded in a repetitive symmetrical code, for example binary code, Gray or cyclic binary code, binary coded decimal or the like. In the preferred form, coding is based upon coded modulation of radiation, as by transmission through radiation-permeable or transparent areas of each track.

The number of concentric tracks on disk 36 is determined by the degree of resolution desired for the compass. For example, if it is desired to obtain a resolution within 1°, i.e., to divide the compass card into 360°, then the individual tracks must each contribute one bit of a binary number at least as large as 360 in decimal notation. This serves to provide a unique number identifying each degree. The smallest number of binary bits which will define any number from 0 to 360 decimal is $2^9$ and thus nine tracks are required for the above noted resolution. The resolution is in theory limited only by the number of tracks and in practice, a 3½ inch diameter compass card can be made with a resolution of $2^{13}$.

The tracks are each radially divided into equiangluar alternating opaque and transparent segments, the total number of segments for each track being even. Conventionally, the innermost track represents the most significant binary digit, each track of greater radius representing then a track of successively lesser significant binary digits. Coding of disks in this manner is well known in the photoelectric digital shaft angle encoding art, so need not be described further here.

The outermost track 51 on card 36 may differ from the others in that it can be used to provide strobe or timing information, in which case it contains the same number of transparent segments as the least significant digit track 50, preferably 360. However, while track 50 in such case would have 360 transparent segments each of one-half degree width, the transparent segments of track 51 are only one-third as wide as those of track 50 and are each radially centered on a corresponding transparent segment of track 50.

Mounted on frame 44 to one side of and preferably well spaced from disk 36 is a light source such as lamp bulb 54. Also mounted on frame 44 closely adjacent to disk 36 on the other side of the latter and directly opposite to the position of bulb 54 are a plurality of photoelectric detectors 56, 57, 58, 59, 60 and 61. Each of the latter is disposed so that only light from bulb 54 traversing a transparent segment of a corresponding track can be incident thereon. Thus, for example, only light from bulb 54 through track 51 can strike detector 56, only light through track 50 can strike detector 57 and so on.

Figure 3:
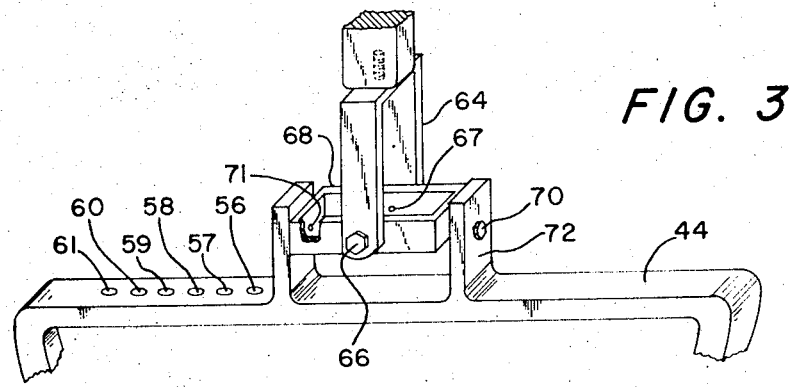
FIG. 3 is a perspective view showing the gimbal arrangement of the compass of FIG. 1.

Frame 44 is supported, particulalry as shown in FIG. 3, by a gimbal structure which comprises a U-shaped first gimbal member of yoke 64 centrally locked or bolted to the end of post 30 with both arms of the yoke extending outwardly from and parallel to the long axis of post 30. A pair of pivot pins 66 and 67 are mounted on respective arms of yoke 64 extending colinearly along an axis perpendicular to the long axis of post 30. Pins 66 and 67 are preferably so positioned that the common axis thereof lies along a diameter of enclosure 20.

Mounted on yoke 64 for rotation about the common axis of pins 66 and 67 is a second gimbal member 68 having mounted thereon another pair of pivots pins 70 and 71. The latter are positioned to extend colinearly along a common or third axis which is normally orthogonal to both the long axis of post 30 and the common axis of pins 66 and 67. This third axis also preferably lies along a diameter of enclosure 20 regardless of the rotational position of member 20 about pins 66 and 67. Frame 44 is fixed to bracket 72 which in turn is suspended from pins 70 and 71 so that the axis of rotation of card 36 is also colinear with a diameter of enclosure 20 regardless of the rotational position of the frame and enclosure with respect to one another (within, of course, the mechanical limits or rotation of the gimbal elements).

The interior of enclosure 20 is preferably filled with a damping fluid such as water, a water-ethanol mixture or the like, due regard being given to reserve sufficient air space 73 to provide for relief of pressure due to thermal expansion. Electrical leads (shown only in fragment in FIG. 1) to transmit signals from photocells 56 to 61 inclusive and to power light source 54 are provided, being preferably brought in along a common multistranded cable 76 which is preferably sealed within stuffing box 34 to prevent leakage of fluid from the interior of enclosure 20, and thence extend into the interior of the latter through opening 32.

In an alternative form of the compass of the present invention in place of disk 36, there may provide a hollow tube or open-ended drum suspended as by a spider from a spindle so as to be rotatable about the cylindrical axis of the latter. In such case the drum is provided with a series of parallel cylindrical tracks which are coded much as tracks 46 to 51 of FIG. 1 are coded.

The operation of the compass is most advantageously described as follows: The compass is preferably filled with a damping fluid through the aperture provided by removing plug 28 which of course is then replaced. The fluid necessarily should be quite transparent to the radiation from bulb 54 and the amount of particulate matter and bubbles therein should be minimized. Because of the immersion of the gimbal structure and card in the same damping fluid, all motions of the card about pivot pins 40 and 41 or about any of the gimbal pivots are damped by the same medium. Additionally, the frictional effects operating on all of the gimbal pivot points is considerably reduced in comparison to ordinary external gimbals, because the gimbals do not support a heavy fluid filled enclosure and even the few elements supported by the gimbals have a lower apparent weight because of their total immersion in fluid.

When the compass is energized, light from bulb 54 traverses transparent segments of tracks 46-51 adjacent corresponding photocells 56-61. The parallel output from the photocells then constitutes a binary coded signal which uniquely identifies the rotational position of card 36 with respect to enclosure 20 as determined by the local magnetic field, e.g. the interaction of magnet 38 and the local horizontal component of earth's magnetic field. As will appear hereinafter, this signal can be appropriately converted to a decimal numerical display or can be used as a control signal, for example to aid in steering a vessel.

It will be apparent that because it is not visually read directly, the compass can be mounted a variety of locations, some quite remote from the user, for example at a masthead or the like. Such remote locations at which vessel or vehicle motion such as pitching, yawing and the like tend to be exaggerated, are feasible locations for the compass of the invention because the internal gimbal structure insures that all six degrees of freedom of motion of the compass card are fluid damped.

Additionally, the provision of a gimbal arrangement by which the compass is pendulously suspended for rotation in all directions about the center of the enclosure permits one to build a compass in which the exterior dimension need be only slightly greater than the diameter of the compass rotor and allows for easy assembly of the device.

Figure 4:
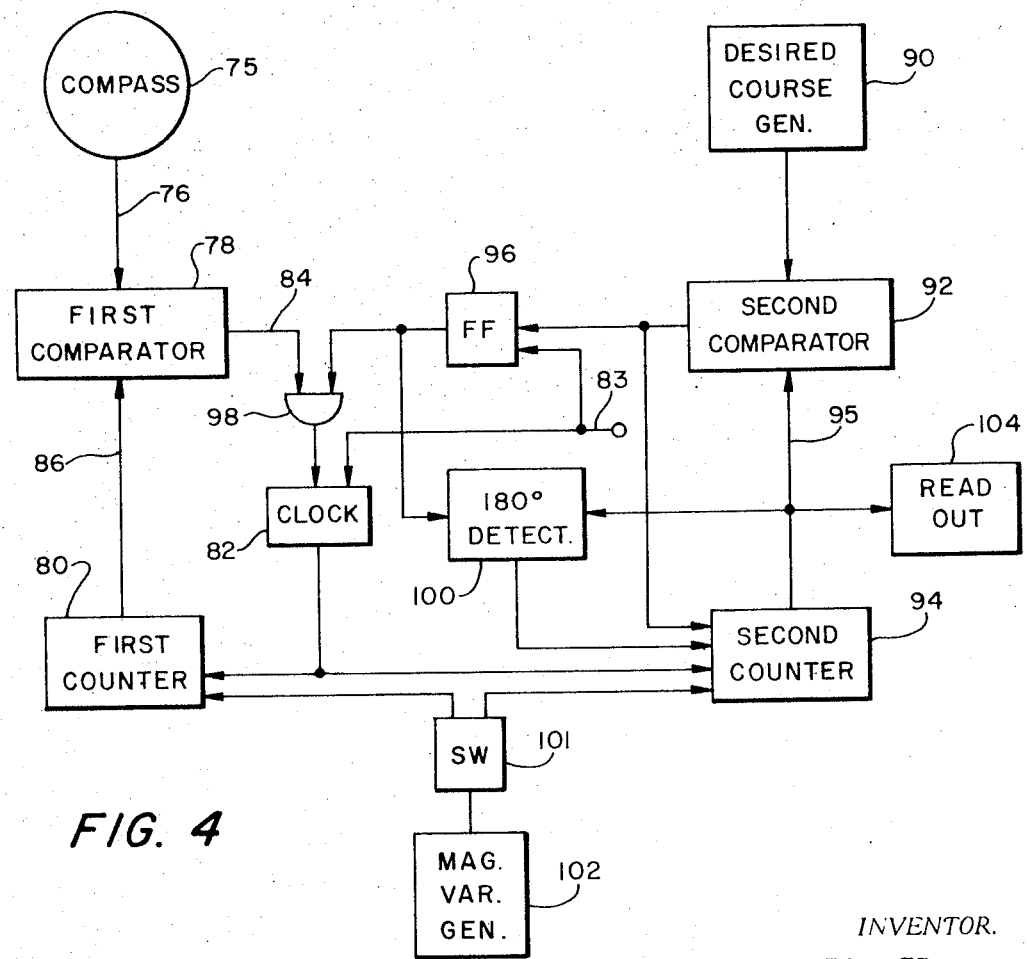
FIG. 4 is a block diagram showing an electrical system for adjusting and displaying the output of the compass of the present invention.

To convert the position of the compass card to a visual digital display, the present invention employs an electronic circuit shown in block diagram in FIG. 4. The output signals from the various photocells in the whole compass shown at 75 are shown as being coupled along bus 76 to first digital comparator 78. There is also included first digital counter 80 connected to count the pulses in the output from digital clock 82. The latter is connected so as to be started by a start signal on first input line 83 and stopped by a gated signal from comparator 78 on output line 84. A bus 86 is provided for coupling comparator 78 to counter 80 so that the state of the latter can be compared by comparator 78 with the signals on bus 76.

The basic system thus described operates as follows: The portion of the compass card such as disk 36 is encoded by photocells into a coded group of signals and the latter is fed into comparator 78 on bus 76. When a start signal, which may be derived from manual operation of a switch or automatically from a timer device, appears on line 83 and starts clock 82, the latter produces a pulse train of fixed repetition rate and counter 80 counts these pulses.

If, for example, the compass heading is 240°, when the count in counter 80 reaches the numeral 240, the output signal from comparator 78 will stop clock 82 if appropriately gated. The count in counter 80 will be indicative of the compass heading.

This foregoing sigmple device preferably includes other important ancillary systems.

Particularly, the present invention preferably includes an off-course detection system comprising course selection generator 90 adapted to be manually set to provide electrical signals indicative of a desired course. To this end generator 90 can include a keyboard with a plurality of keys having decimal indicia, a power source and a diode matrix for encoding the key positions into a numerical code compatible with the numerical system used to count in counter 80. Alternatively, generator 90 can comprise a number of rotatable thumb wheels which are multiposition switches such as those sold under the trade designation "Digiswitch" by the Digitram Co., Pasadena, California, to provide the requisite numerical coding of the thumb wheel positions, or can comprise a direct encoding keyboard operated switching system such as those disclosed in U.S. Pats. No. 3,564,541, No. 3,419,697 and the like.

The output signals from generator 90 are fed to one side of comparator 92 which is preferably a digital comparator of the same type as comparator 78. Second digital counter 94 is also connected to clock 82 for connecting the output of the latter. However, counter 94 is a known type of up-down or reversible counter capable of counting in either direction. Counter 94 is coupled to comparator 92 by bus 95 so that the comparator can compare the state of counter 94 with the signals from generator 90 to provide an output signal when the two are identical.

The output of comparator 92 is connected back to counter 94 so as to reset the latter to its zero state, and is also connected to the set input of a bistable pulse generator or flio-flop 96. The output of the latter is connected to an enabling input of AND gate 98, and another input to the latter is line 84. The output of gate 98 is connected to clock 82 so that a signal appearing thereon will start the clock. The reset input to flip-flop 96 is connected to line 83.

The device of FIG. 4 further includes a 180° detect circuit 100 which can be simply a comparator having a preset number against which it compares input signal, in this case the preset number being the equivalent of decimal 180. The input to circuit 100 which provides signals to be compared is connected to bus 95. The output of circuit 100 is connected to an up-down control input of counter 94.

Coupled through switch 101 to both counter 80 and counter 94 for pre-loading alternatively either of counters to a preset value is magnetic variation signal generator 102 which typically is a thumbwheel switch of the type heretofore described in connection with generator 90. Lastly, connected to bus 95 is read-out circuit 104, typically a three-decimal digit display unit having internally therein means for converting to decimal form whatever code the system of FIG. 4 employs in the counters, and any desired display amplifiers and drivers.

In operation, as previously noted, compass 75 provides a parallel coded output, preferably one which constitutes a binary coded signal uniquely identifying the rotational position of the compass card with respect to its enclosure. The signal, for exemplary purposes can be assumed to be the binary equivalent of decimal 010, representing then a heading or course of 010° Magnetic. It may also be assumed for purposes of the example that either any desired course signal or magnetic variation is to be introduced into the device by respective generators 90 and 102.

An input pulse or start signal, applied on line 83, starts clock 82 and resets flip-flop 96 so that the output of the latter cannot enable gate 98. Counter 80 and counter 94 then both start to count the output of clock 82, both from zero and in the direction of an increasing count. When each of the counters simultaneously reaches the count of 010, comparator 92 provides a pulse which sets flip-flop 96. The output of the set flip-flop then enables gate 98. At the same time, the count in counter 80 having matched the output from compass 75, comparator 78 produces a pulse which, passing through enabled gate 98, stops clock 82. The count in couner 94 is identical, of course, to the count in counter 80, and this is read out on device 104, thereby indicating the compass head.

It can be assumed for another example that, using the same numerical value for the compass heading, the thumb wheel switches or keyboard or generator 90 is set to provide a signal which is the binary equivalent of decimal 020, representing then a desired course of 020. Lastly, it can be assumed that the output of generator 102 is set to provide a signal which is the binary equivalent of decimal 004 representing a local magnetic variation of 4° W. In the device of FIG. 4, switch 101 is arranged so that if the local magnetic variation is westerly, the output of generator 102 is applied to counter 80; conversely if the variation is easterly, the output of generator 102 is applied to counter 94. In the example given, of course switch 101 is set so that the binary signal from generator 102, the equivalent to decimal 004, is preloaded into counter 80 so that the initial state of the latter is then the equivalent of 004.

Again as in the previous example, an input pulse on line 83 starts clock 82 and resets flip-flop 96 to disable thereby gate 98. Counter 80 then starts at its preloaded count and counts up to a point at which the output of comparator 84 is applied to gate 98 as in the previous example. However, in this case, when counter 80 reaches the count of 010, the count in counter 94 is 006. Thus, when comparator 84 produces a pulse due to the matching of its inputs on lines 76 and 86, gate 98 remains disabled and passes no signal. Both counters continue to count the pulses from clock 82 so that when counter 80 now reaches the count of 024 the count in counter 94 has now reached 020. At this point, comparator 92 now produces an output signal or pulse which serves several functions. First, the pulse sets flip-flop 96 to provide an enabling output to gate 98. Further, it resets counter 94 to its base or zero state, and lastly, it enables detector 100. Although gate 98 is enabled, there being no output at this point from comparator 84, clock 82 continues to run.

The two counters then continue to count the clock output, counter 80 proceeding from the count of 024 and counter 94 from its base state which here is 000. When counter 80 reaches a count of 204, and counter 94 thus has reached a count of 180, enabled detector 100 then produces an output signal or pulse which now reverses counter 94, causing the latter to count backward or down. The two counters continue to run now in opposite directions until counter 80 reaches a count of 359, at which point the total in counter 94 is 025, having counted down from 180. Counter 80, on the next count goes to 000 inasmuch as the preload is applied only to the counter at the beginning of or prior to counting, and counter 80 now begins to count up again until it reaches 010. At that point, comparator 78 produces an output signal which, being passed by enabled gate 98, stops clock 82. The count in counter 94, appearing on readout device 104 is then 014° which is the difference or differential between the magnetic heading indicated by compass 75, the desired course inserted into generator 90 as corrected by the local variation preloaded by way of generator 102.

If one wishes, the device may also include another comparator connected for comparing the state of reading in counter 94 with another preset number, thereby to produce an output when the off-course value exceeds the preset number. This latter output can be used to trigger an alarm or the like.

Figure 5:
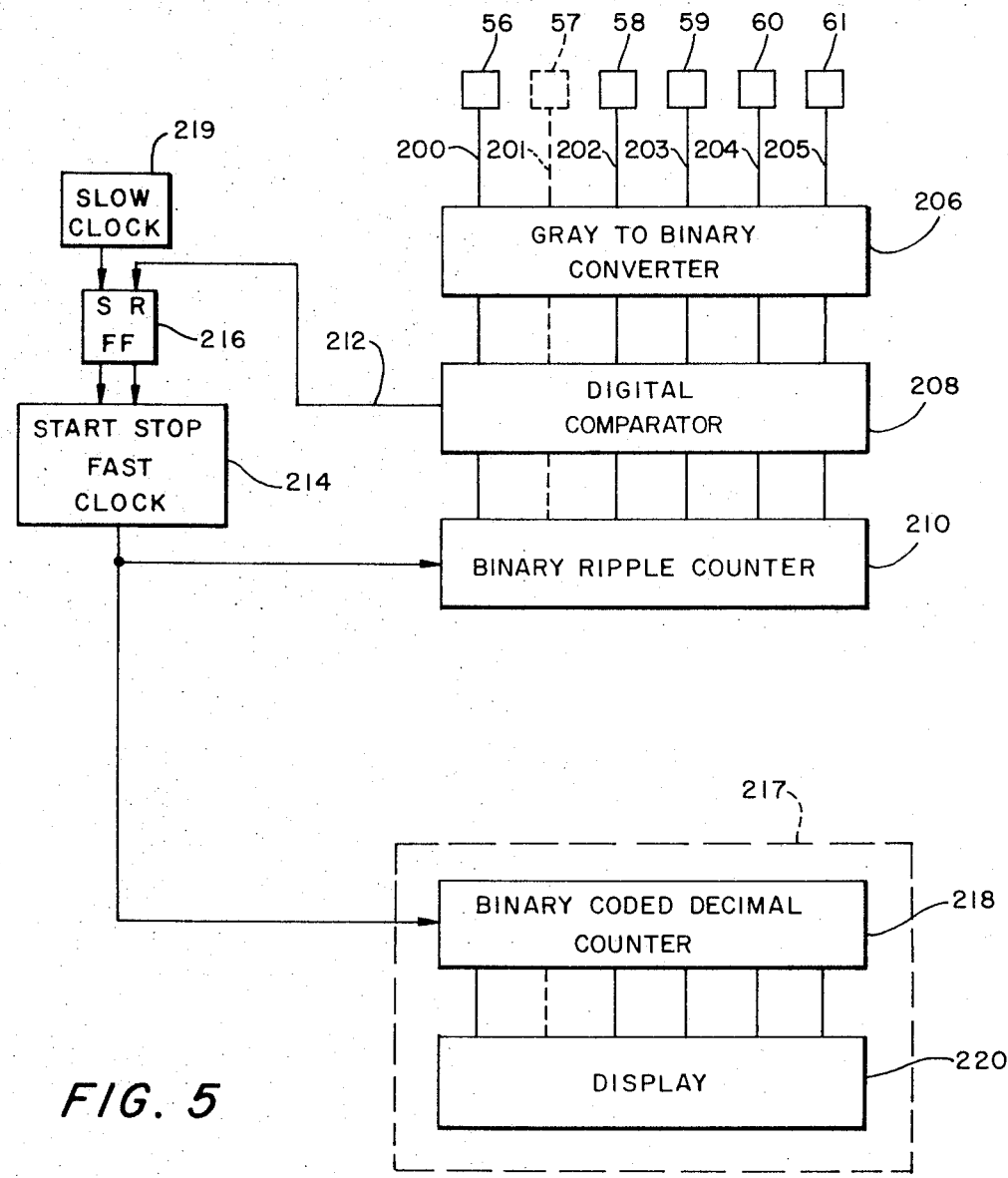
FIG. 5 is a block diagram showing another electrical system of the present invention for use in adjusting and remote display of the compass output.

Referring now to FIG. 5 there is shown yet another variation of the device of the present invention particularly adapted for use in connection with a code wheel or disc 36 which is coded in Gray code. To convert the Gray code to binary, outputs lines 200 to 205 inclusive from photocells 56 to 61 inclusive (using the same five sensor configuration which is exemplary of FIG. 1, but which it is understood, as indicated by the dotted line delineating sensor 57, is a much smaller number than would actually be used in practice) are coupled to respective inputs of a Gray-to-binary converter 206.

Typically, the latter is a cascaded series of gates, as is well known in the art, and is typified by the system described in *Electronic Analog-Digital Conversions*, H. Schmid, Van Nostrand Reinhold Co., (1970) pp. 312–313.

The outputs of the converter, a group of parallel leads each bearing a signal indicative of the states of the sensors reexpressed in binary code, is coupled to inputs to digital comparator 208. The latter typically is formed of a plurality of exclusive OR gates each having a pair of inputs terminals, one such input terminal of each gate being connected to the corresponding output line from converter 206. Also included is a binary counter 210, typified by the system described in *Electronic Integrated Circuit and Systems*, F. C. Fitchen, Van Nostrand Reinhold Co. (1970) pp. 340–342. Each bistable counter stage of counter 210 is connected to a respective other or second input terminal of the OR gates in comparator 208, the lines to each such OR gate respectively from converter 206 and counter 210 are selected to carry signals representing digits of the same numerical significance, i.e., power of 2. The output of the gates of comparator 208 are all connected together to a common lin 212 which in turn is connected to the disable or stop terminal of clock means comprising clock 214 and flip-flop 216. The clock typically is a substantially fixed frequency pulse generator which is designed to operate, for example, at a rate of 100 KHz. Flip-flop 216 has set and reset inputs. The output of the flip-flop is connected so that when the flip-flop is activated by an input signal or pulse to the set input, the output of the flip-flop starts clock 214. When the flip-flop is reset by a signal at its reset terminal (which constitutes the stop terminal of the clock means), the flip-flop output then stops clock 214. The output of clock 214 is connected to the input count terminal of binary counter 210.

The version of the present invention shown in FIG. 5 also includes means for controlling the sampling rate, and to this end there is included slow clock 218, which is also typically a pulse generator of fixed frequency, but in this instance the pulse repetition rate provided by clock 218 can typically be about 50 Hz. The output from clock 218 is connected to the set terminal of control flip-flop 216. Lastly, the embodiment of FIG. 5 includes a receiver and display unit 217 which comprises a binary coded decimal (BCD) counter 218 and a decimal display unit 220 connected to the counter for displaying in decimal numerals the state of the BCD counter. The input to the count terminal of the BCD counter is a line from fast clock 214. Counters of this type are described in *Electronic Integrated Circuits and Systems*, Supra, pp. 343–344. Typically, the display unit 220 may comprise a BCD-to-decimal converter or a BCD-to-seven-segment converter, display driver amplifiers and a glow tube or segmented display, all as well-known in the art.

In operation of the device of FIG. 5 as thus described it is preferred that the code wheel or disc 36 be coded in Grey of cyclic binary code, and that the code disc is coded to provide only a sequence of Gray code values corresponding to the decimal numerals from 76 to 435. These latter values are chosen because the transition between the Gray code equivalent of decimal numeral 435 and the Gray code equivalent of decimal numeral 76 is merely a one-bit change. Thus, for the entire code disk, each transition from one value to the next adjacent value will be accomplished with but a single bit change.

The light signals produced by such a Gray-coded disk are picked up on sensors 56–61 inclusive and are converted by the Gray-to-binary converter 206 to provide an output which is the binary code equivalent of the Gray code input. Depending on the nature of the gates in comparator 208, these signals may then be inverted or remain non-inverted to obtain compatibility for those comparator gates with the signals from binary counter 210, and are then compared with the latter signals in the gates of comparator 208.

A pulse from slow clock 218 or some other source of a start signal is applied to the set input of flip-flop 216 and thus starts clock 214. It will be appreciated that clock 219 provides a pulse typically every two hundredths of a second, but the output of clock 214 provides a pulse typically every 10 microseconds, hence between pulses from clock 219, clock 214 can provide up to 2,000 pulses. Of these, the first pulse applied to both counter 210 and counter 218 serves to reset both to their respective zero states which for counter 218 is true BCD zero and for counter 210 is the binary equivalent of decimal 76 as previously noted. Thus counters 210 and 218 start to count up in tandem, the state of counter 210 being examined by comparator 208 and compared with the signals from converter 206. The state of counter 218 can be displayed continuously on display 220. When the state of counter 210 exactly matches the state of the output lines from converter 206, comparator 208 will provide an output signal on line 212. For example, assuming that comparator 208 uses exclusive OR gates, only if each and every gate has matched input signals (e.g. one signal "up" and the other "down") will an output signal be provided, because any "unmatched" gate will keep the output "down."

The output signal on line 212 then resets flip-flop 216 turning clock 214 off. The count in counter 218, made during the interval required to achieve comparison between the count in counter 210 and the output of converter 206, is then displayed on display 220 until the next clock pulse from clock 218 again turns on clock 214, the counters become reset and the cycle again occurs.

It will be understood that the embodiment of FIG. 5 can be further implemented with means for introducing a correction for magnetic variation, an off-cause indicator and the like as in FIG. 4. However, a particularly important aspect of the embodiment of FIG. 5 is that the latter uses but a single data line between the receiver and display unit 217 and the remainder of the device. Where one wishes to mount the receiver and display unit at a location remote from the compass and remainder of the device, the cost is conderably reduced, installation simplified and trouble-shooting minimized by the use of such a single data line.

Since certain changes may be made in the above apparatus without departing from the scope of the invention herein involved, it is intended that all matter contained in the above description or shown in the accompanying drawing shall be interpreted in an illustrative and not in a limiting sense.

What is claimed:

1. A circuit for use with a compass having a digitally coded output indicative of the compass heading, said circuit comprising in combination:
    clock means for providing a train of timed signals;
    first counter means for counting said train;
    means for comparing the state of said first counter means with said coded output;
    means for arresting the counting when said state of said first counter means bears a predetermined relationship to said coded output;
    output means for providing an output signal determined by the state of said counter means after arrest of said counting, said output means comprising a second counter means connected for counting said train, and means for determining the state of said second counter; said second counter being connected so that the count of said train therein is arrested by said means for arresting when the latter arrests the counting by said first counter means;
    means for providing a signal corresponding to an arbitrary selected value,
    means for comparing the state of said second counter means with said signal corresponding to said arbitrary selected value; and
    means for resetting said second counter means to a base counting state when the state of said second counter means bears a desired relationship to said selected value.

2. A circuit as defined in claim 1 including means for starting the count of said signals in said first counter means.

3. A circuit as defined in claim 2 wherein said means for starting the count is operated manually.

4. A circuit as defined in claim 1 wherein said means for starting the count is a second clock providing signals at a repetition rate slower than the repetition rate of said train.

5. A circuit as defined in claim 1 wherein said output means comprises means for displaying, in decimal form, said output signal.

6. A circuit as defined in claim 1 wherein said means for arresting comprises gate means for coupling an output signal from said means for comparing the state of said first counter means to said clock means so as to stop the latter,
    a bistable device having one output thereof connected so as to enable said gate means, and having a pair of input terminals, one of said input terminals being connected to said means for comparing the state of said second counter means so as to be energized by the last-named means when the state of said second counter means bears said relationship to said selected value such that said bistable device enables said gate means, the other input terminal of said bistable device being connected to a source of an input state signal and to said clock means such that a start signal from said source starts said clock means and causes said bistable device to disable said gate means.

7. A circuit as defined in claim 1 wherein said second counter means is a reversible counter, and including means for reversing the direction of count in said second counter means whenever the state of said second counter means reaches a predetermined value.

8. A circuit as defined in claim 7 wherein said means for reversing is only becomes operative responsively to the resetting of said second counter upon determination that the state of said counter bears said desired relationship to said selected value.

9. A circuit as defined in claim 1 wherein said predetermined value of said second counter means is the equivalent of the decimal value 180.

10. A circuit as defined in claim 1 including means for alternatively presetting either of said counter means to an arbitrary selected value prior to counting.

* * * * *